US008209695B1

(12) United States Patent
Pruyne et al.

(10) Patent No.: US 8,209,695 B1
(45) Date of Patent: Jun. 26, 2012

(54) RESERVING RESOURCES IN A RESOURCE-ON-DEMAND SYSTEM FOR USER DESKTOP UTILITY DEMAND

(75) Inventors: James C. Pruyne, Naperville, IL (US); Akhil Sahai, Santa Clara, CA (US); Kumar Goswami, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1729 days.

(21) Appl. No.: 11/495,357

(22) Filed: Jul. 28, 2006

(51) Int. Cl.
*G06F 9/50* (2006.01)
(52) U.S. Cl. ........................................ 718/104; 709/226
(58) Field of Classification Search .................. None
See application file for complete search history.

(56) References Cited

U.S. PATENT DOCUMENTS

| 7,475,419 | B1 * | 1/2009 | Basu et al. ........................ 726/2 |
| 2002/0194251 | A1 * | 12/2002 | Richter et al. ................. 709/105 |
| 2004/0139202 | A1 * | 7/2004 | Talwar et al. ................. 709/229 |
| 2005/0027863 | A1 * | 2/2005 | Talwar et al. ................. 709/226 |
| 2006/0218285 | A1 * | 9/2006 | Talwar et al. ................. 709/227 |
| 2007/0240161 | A1 * | 10/2007 | Prabhakar et al. ............ 718/104 |
| 2007/0271560 | A1 * | 11/2007 | Wahlert et al. .................... 718/1 |

OTHER PUBLICATIONS

Sulistio, A; Buyya, R; "A Grid Simulation Infrastructure Supporting Advance Reservation"; Parallel and Distributed Computing and Systems: Proceedings of the 16th IASTED International Conference. 2004.*
IBM Autonomic Computing, http://www.research.ibm.com/autonomic/overview/solution.html, downloaded Jul. 28, 2006.
Microsoft, System Center Virtual Machine Manager Product Overview, http://www.microsoft.com/systemcenter/scvmm/evaluation/overview/def..., May 22, 2006.
Microsoft, Virtual Server 2005 R2 Product Overview, http://www.microsoft.com/windowsserversystem/virtualserver/evaluation..., May 14, 2004, updated Mar. 20, 2006.
Sun, Utility Computing, http://www.sun.com/service/sungrid/overview.jsp, downloaded Jul. 28, 2006.
VMware, http://www.vmware.com/products/free_virtualization.html, downloaded Jul. 28, 2006.
Sahai, A. et al., "Automated Policy-Based Resource Construction in Utility Computing Environments", HPL-2003-176, Hewlett Packard Co., Aug. 21, 2003.
Smith, W., "Scheduling with Advanced Reservations", 14th International Parallel and Distributed Processing Symposium, 2000.

* cited by examiner

*Primary Examiner* — Qing Wu

(57) ABSTRACT

Resources in a resource-on-demand system are reserved to support user desktop utility demand. A demand calendar specifies capacities of resources in the resource-on-demand system reserved to support user desktop utility demand for future time periods. A requested capacity is compared to capacities from the demand calendar for a requested future period of time to determine whether resources for the requested capacity are to be reserved.

20 Claims, 3 Drawing Sheets

RESERVING RESOURCES IN A RESOURCE-ON-DEMAND SYSTEM FOR USER DESKTOP UTILITY DEMAND

BACKGROUND

Grid computing services, utility-based data centers, and other types of resource-on-demand systems are becoming increasingly popular as a highly scalable means for utilizing computer resources to meet the computing demands of users.

Managing these resource-on-demand systems is a difficult task that typically requires a significant amount of time and labor. Resource-on-demand systems typically pre-allocate and pre-install servers and storage resources for customer applications. In order to meet predetermined quality of service (QoS) requirements, however, servers are typically over-provisioned and under utilized.

Determining the allocation of resources is an even more difficult task if user demand is for remote desktop sessions. Remote desktop sessions typically include a backend server providing a desktop for a user. A remote desktop session may include an operating system and the applications that a user would typically have access to if the user's desktop was created and executed by the user's personal computer. However, the remote desktop session is executed by a back-end system, and the user may access the remote desktop via a thin client.

Allocating resources for remote desktop sessions is difficult because a user may run any number of applications in the session at any time and because it is difficult to keep track of the demand for a large number of users over an extended period of time.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

Figure 1:
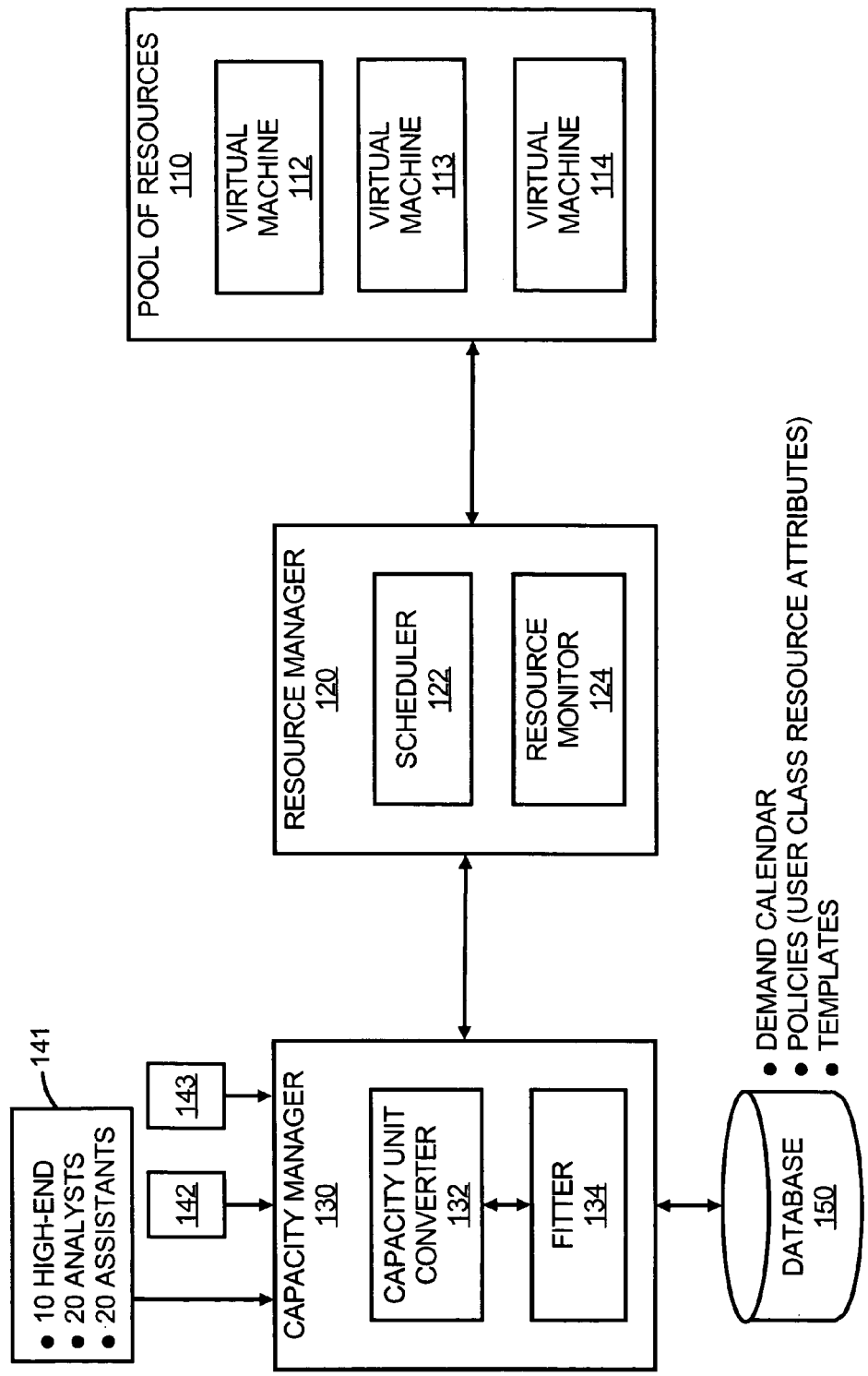
FIG. 1 illustrates a resource-on-demand system, according to an embodiment.

For simplicity and illustrative purposes, the principles of the embodiments are described. However, one of ordinary skill in the art would readily recognize that the same principles are equally applicable to, and can be implemented using variations of the described embodiments.

According to an embodiment, a resource-on-demand system is operable to reserve resources for virtual machines supporting user desktop utility demand. A desktop utility is a kind of utility computing environment where users' desktops are run on back-end resources in a resource-on-demand system instead of running, for example, on individual personal computers. For example, servers in a compute cluster or other resources in a resource pool support remote desktop sessions running all the users' applications remotely. The users typically use thin clients to connect to the remote servers running their desktop sessions. A thin client is software, hardware or combination of hardware and software that serves as a client. The thin client may include display and user input capabilities but may not include a hard disk drive because applications are hosted on a remote server and interacted with through the thin client.

The resource-on-demand system is operable to create virtual machines on its resources to run the remote desktop sessions. A virtual machine is a logical entity comprised of one or more physical machines or portions of the capacity of one or more physical machines. A physical machine may be a server, or processors, memory, etc. For example, a virtual machine may be comprised of a percentage of compute cycles for one or more processors, 1 GB memory and 10 GB memory size. Each virtual machine is characterized by its demand. The user desktop utility demand is the demand created by remote desktop sessions of users. A virtual machine may be created for each remote desktop session or may be created for a group of remote desktop sessions. The virtual machine is sized to support the user desktop utility demand of the remote desktop sessions it is running. As with physical machines, metrics such as processing speed and physical memory size may be used to express demand of a virtual machine. Known server partitioning technology may be used to create a virtual machine, such as VMWare, Virtual Server, Xen, etc.

According to an embodiment, resources in the resource-on-demand system are reserved to accommodate requests for resources to support user desktop utility demand for future time periods. A demand calendar may be used to keep track of reserved resources and to schedule new reservations as needed. Also, reservations may be based on user classes to simplify requests. Furthermore, resources may be characterized in terms of capacity units to determine whether sufficient resource capacity is available to accommodate requests and for fitting requested capacity to available resources. Also, requests may be prioritized, and priority may be used to determine whether to accept or reject requests and for fitting.

FIG. 1 illustrates a system 100 according to an embodiment that provides computer resources on demand. The system 100 includes a pool of resources 110, a resource manager 120 and a capacity manager 130.

The pool of resources 110 may include processors, memory, disk storage, network slots, servers, etc. For example, the pool of resources 110 may include any type of resource available on servers or clusters of servers or racks of bladed servers that are to be shared by applications. The pool of resources 110 may include heterogeneous resources, such as resources of varying types, e.g., compute servers or network links, and varying capacities, e.g., CPU speeds and link bandwidth.

In one embodiment, virtual machines are created on the pool of resources 110. For example, virtual machines 112-114 are created to support the user desktop utility demand for the users specified in the requests 141-143. The user desktop utility demand may be determined in terms of capacity units of the requested capacities for the requests 141-143, as described in further detail below.

The capacity manger 130 manages requests for resources. The requests may include requests for reservations of resources to accommodate user desktop utility demand for future time periods, and the requests may be based on user classes. The capacity manager 130 determines whether requests 140 are accepted or denied and determines a plan for assigning resources in the pool of resources 110 to a request based on the request demand, such as the user desktop utility demand for the request. Multiple resource attributes in a request may be used to determine the demand. The capacity manager 130 provides the resource manager 120 with instructions for assigning the demand to resources from the pool of resources 110 based on the plan.

Since the pool of resources 110 may be virtualized, it can be configured to accommodate different workloads. For example, user classes may be created, such as "assistant", "analyst", and "high-end." Each user class may include a set of constraints, such as information for sizing a virtual machine, applications that can be run for the user class, and priority of the user class. These constraints may be stored in a database 150, and may be changed as needed by system administrators. The constraints for user classes may be stored as policies for each user class in the database 150. The database 150 may be any means for storing and receiving data. The database 150 may be the physical storage for storing the data and/or the organization of the data for storing and retrieving the data. Examples of the organization of the data may include a relational database, flat files for storing the data, etc.

Resource attributes may be specified for a user class and used to size a virtual machine for the user class. For example, attributes may represent different types of resources, such as processors, memory, disk space, bandwidth, number of network slots, network bandwidth, and storage input/output (I/O). The attributes may be in terms of capacity attributes, such as number of processors, processor speed, amount of memory, amount of storage space, amount of bandwidth, etc. The attributes may be specified in the constraints.

In one example, the policy for a user class includes capacity attributes, such as number of processors, processor speed, amount of memory, amount of storage space, amount of bandwidth, etc. The virtual machine for the user class is sized based on the capacities specified for these attributes. The capacities may be specified per user, so the virtual machine is sized based on the number of users specified in a request for a user class. Several virtual machines of different sizes may be running at any given time and may be accommodating a blend of user classes.

The utility environment provided by the system 100 allows for simplified reservation capability. For example, resource capacity from the pool of resources 110 may be reserved by business managers on behalf of their users for a particular time interval that includes a future time period. Requests 141-143 shown in FIG. 1 are examples of requests generated by users, such as project managers. For example, the request 141 includes a request for resources to support demand generated by desktop sessions for a group of users comprised of 10 high-end users, 20 analysts and 20 assistants. Requests 142 and 143 may include similar types of requests. Although not shown, the request 142 may be for 20 high-end users and 20 office assistants, and the request 143 may be for 20 analysts and 10 office assistants. The requests 141-143 may include future periods of time that the resources are being requested. The time periods may overlap.

In one embodiment, templates are provided for different resource needs. The template is a "canned" request, which a user may use as a guide for requesting resources. The templates may include predetermined resource attributes that a user provides values for to accommodate their computing needs. Also, the templates may be customized for a particular environment. A template may include fields for user class, number of users per user class, start and end time of the reservation, and recurring time intervals. The start and end time for the reservation indicates when the resources requested have to be made available to the user. The recurrence pattern specifies the periodic need for the resources, such as weekdays, weekends, end of month, etc. The templates may be stored in the database 150 and provided to users requesting resources as needed. The users complete the templates and send the completed templates as requests for resources.

The requests 141-143 are received by the capacity manager 130 and are converted to requested capacities. In one embodiment, constraints specified in policies for the user classes are used to determine the requested capacities. The requested capacities are used to determine whether a request is accepted or rejected and for fitting a request.

The capacity manager 130 includes a capacity unit converter 132 and a fitter 134. The fitter 134 determines the requested capacities for the user requests 141-143. In one embodiment, the requested capacities are determined in terms of capacity units. The capacity unit converter 132 converts resource attributes for a request to capacity units.

A capacity unit is a single unit of measurement. For example, a conventional unit of measurement for processor speed is Hz. According to an embodiment, the capacity unit represents a single unit of measurement that may be used to represent multiple resource attributes for resources. For example, a request may include attributes such as processor speed, amount of memory and amount of storage space requested. These types of attributes are referred to as capacity attributes. The multiple attributes are converted to capacity units.

The conversion to capacity units may be based on specific quantities, referred to as quantums, for each of one or more resource attributes. The quantums may be specified in policies that can be customized for different types of requests and for maximizing utilization of resources. Also, quantums may be used to convert to capacity units by dividing a resource attribute value by the quantum for that resource attribute, as further described in the examples below.

For example, the request 141 includes a request for 10 high-end users, 20 analysts and 20 assistants. The capacity resource attributes for the high-end user class may include 2 GHz processing speed and 1 GB of memory. The capacity unit converter 132 converts the resource attributes of 2 GHz processing speed and 1 GB of memory to capacity unit values using the quantums for processing speed and memory size. For example, the quantum for processor speed is 500 MHz and the quantum for memory size is 128 MB of memory. Using the quantum for processor speed, the 2 Ghz processor speed from the request is converted to 4 capacity units, because 2 GHz is 4 times the quantum value of 500 MHz. Similarly, the 1 GB memory size from the request is converted to 8 capacity units, because 1 GB is approximately 8 times the quantum value of 128 MB.

The conversion results in two capacity unit values of 4 capacity units and 8 capacity units. According to an embodiment, a single capacity unit value is used to represent the requested capacity. According to an embodiment, the determination of the single capacity unit value is based on whether the capacity unit value represents the requested capacity or the capacity of the physical machine in the pool of resources being allocated.

For example, if the capacity unit value represents a physical machine, which may be used to run the virtual machine sized for the request, the smallest of the capacity unit values is selected as the single capacity unit value, which is 4 capacity units in this example. If the capacity unit value represents the requested capacity, then the largest of the capacity unit values is selected as the single capacity unit value, which is 8 capacity units in this example. The request is then matched with available physical machines from the resource pool 110 having at least 8 capacity units. For example, available capacity of resources must be at least 8 capacity units for the request to be accepted and assigned to resources.

The 8 capacity units may be the requested capacity for a single high-end user. The request 141 specifies 10 high-end users, so 80 capacity units is the requested capacity for the high-end users for their virtual machines. When matching with available capacity of physical machines, the request 141 may be considered as 10 independent requests of 8 capacity units each to determine where those desktops can be hosted since no single resource may be able to host 80 capacity units. That is, even if no single resource has a capacity of 80 units, we can still satisfy the request on multiple, smaller resources. The request 141 also include 20 analysts and 20 assistants, so the total requested capacity for the request 141 is greater than 80 capacity units. Assuming the total capacity is 110 capacity units, 110 units is matched with 110 capacity units of available capacity, and the capacity for each user may be treated as an independent request for matching the resources with the request. Similar calculations are performed to determine the requested capacity and to match the requested capacity with available resources for the requests 142-143.

Policies stored in database 150 may specify quantums, capacity resource attributes and other constraints for each user class. The quantums may be modified to minimize inefficiencies. Also, policies may specify how to determine the single capacity unit value from capacity unit values for multiple attributes. For example, a policy may specify selecting a capacity unit value other than the smallest value as the single capacity unit value for physical machines. Also, policies may be class-based. For example, if a request is an instance of a class, and a policy is defined for the class, that policy is applied to the instance of the class and any subclasses of the class. Policies may be stored in a database 150 connected to the capacity manager 130. Also, the demand calendar may be stored in the database 150.

In one embodiment, capacity unit values for a single user for each class may be stored in the database 150. Then, if a request is received requesting a specific number of users for each class, such as shown for the requests 141-143, the stored capacity unit value for a class may be multiplied by the number of users requested for the class to determine the requested capacity. In this embodiment, the conversion to capacity units need not be performed every time, unless the quantums are modified.

Also, requests need not be in the form of numbers of users for each class. For example, a request may specify resource attributes for resources being requested, such as 2 GHz processing speed, 1 GB memory, 100 GB disk space, etc. Then, quantums for each resource attribute are used to convert the request to capacity units. Then a single capacity value may be determined, which is the requested capacity.

The fitter 134 uses the requested capacity of 110 capacity units and a demand calendar to determine whether 110 capacity units are available for the time period the resources are requested, which may be specified in the request 141.

The demand calendar may be a data structure that represents the total capacity, allocated capacity and unallocated capacity of the resources in the resource pool 110 over time. The capacity may be stored in the demand calendar in terms of capacity units.

A demand calendar may be provided for set of aggregated resources that can be allocated to requests. For example, if all the resource in a pool of resources can be aggregated and portions of the resources can be assigned to different requests, then a single demand calendar may be used. If only resources with each server can be aggregated and portions of the resources can be assigned to different requests, then each server has its own demand calendar. In another example, a cluster of servers can be aggregated and has its own demand calendar. Request demand may be matched with available capacity specified on different calendars for different sets of aggregated resources.

To determine whether a request can be satisfied, the request is "unrolled" into the demand calendar based on the time period, which may be recurring, that the resources are being reserved. This is a process of starting at the beginning of the first time the resources are requested. For example, the request 141 may be a request for resources for the weekdays for 52 weeks in a calendar year. Assume the requested capacity of 110 capacity units is for each weekday of the year. The demand calendar stores the total capacity of the resources in the resource pool 110 for each day, the allocated capacity for each day and the unallocated capacity, also referred to as available capacity, for each day. The fitter 134 compares the unallocated capacity for each weekday of the year to the requested capacity of 110 capacity units. If the unallocated capacity for each weekday is greater than or equal to 110 capacity units, then the request is accepted.

The 110 capacity units may be represented as a capacity for each user, such as 8 capacity units for each high-end user, 1 capacity unit for each analyst, and 0.5 capacity units for each assistant. Then, the capacity for each user may be treated as an independent request for matching, because a single resource or set of aggregated resources that can be allocated to requests may not be able to accommodate such a large request.

The available capacity, also referred to as unallocated capacity, is the total capacity minus the allocated capacity. The available capacity of resources in the resource pool 110 may be used to determine whether resources can satisfy a request.

If the unallocated capacity of all the resources that may be allocated is less than 110 capacity units for any of the weekdays, then the request may be rejected. However, priorities of requests may result in allocated capacity for a request being reassigned to a request of higher priority. For example, the request 141 may have a higher priority than the request 143, because the high-end user class may be higher than the analyst user class and office assistant user class in the request 143. Thus, some of the requested capacity from the request 143 may be annexed for the request 141, assuming the requested capacity for the request 141 had already been allocated and that insufficient unallocated capacity was available to satisfy the requests. In this example, the priority of the request is the highest priority user class in the request. However, priorities may be determined in another manner. Policies in the database 150 may specify the priority determination method and the factors for bumping capacity for a request based on priorities. Factors may include class priorities, whether a user is willing to pay more for capacity, etc.

In most cases, particularly when few requests have been received or the system is just starting up, the available capacity exceeds the requested capacity. The fitter 134 may use a fitting function to select resources to be allocated to the request. A fitting function may be used to best satisfy an objective, such as packing or load balancing. Examples of known fitting functions are round-robin, first-fit and best-fit. For example, if the goal is to be able to accept as many requests as possible, a best-fit fitting function may be used to pack as much capacity on the resources of the pool of resources 110.

A fitness value may be used to represent how well the fitting function is allocating resources to meet the objective. For example, for packing, the fitness value is defined as the remaining capacity on a physical machine, such as a server, after all the requested capacity is allocated. A small, non-negative value indicates a good fit as it comes close to filling the physical machines capacity completely.

The fitter 134 marks the demand calendar with the requested capacities of the requests 141-143 assuming sufficient capacity is available to satisfy the requests 141-143. The fitter 134 may also update the allocated and unallocated capacity for each interval, such as for each day, on the demand calendar.

The fitter 134 also instructs the resource manager 120 to allocate the resources to the requested capacity of the requests 141-143. The resource manager 120 includes a scheduler 122 and a resource monitor 124. The scheduler 122 schedules workloads of the requests 140 to run on resources based on resource assignments determined by the capacity manager 130, which are indicated on the demand calendar. Although one resource manager is shown, multiple resource managers may be used.

The scheduler 122 may allocate resources for creating virtual machines to accommodate the requested capacities of the requests 141-143. For example, the virtual machines 112-114 are created to run remote desktop sessions for the users specified in the requests 141-143. The virtual machines 112-114 are sized to accommodate the requested capacities. In one embodiment, a virtual machine is created for each user class. For example, the virtual machine 112 is sized for all the users in the high-end user class needing capacity. The virtual machines 113 and 114 are sized for the number of users needing capacity in the analyst and office assistant user classes, respectively based on the requested capacities for the requests 141-143 and any other requested capacities for the same time periods.

The resource monitor 124 monitors predetermined metrics of the resources in the pool of resources 110. For example, the resources may be represented using one or more capacity attributes, such as CPU, memory, I/O operation rates, and bandwidths. The resource monitor 124 may be used to determine whether a predetermined QoS is being met.

Figure 2:
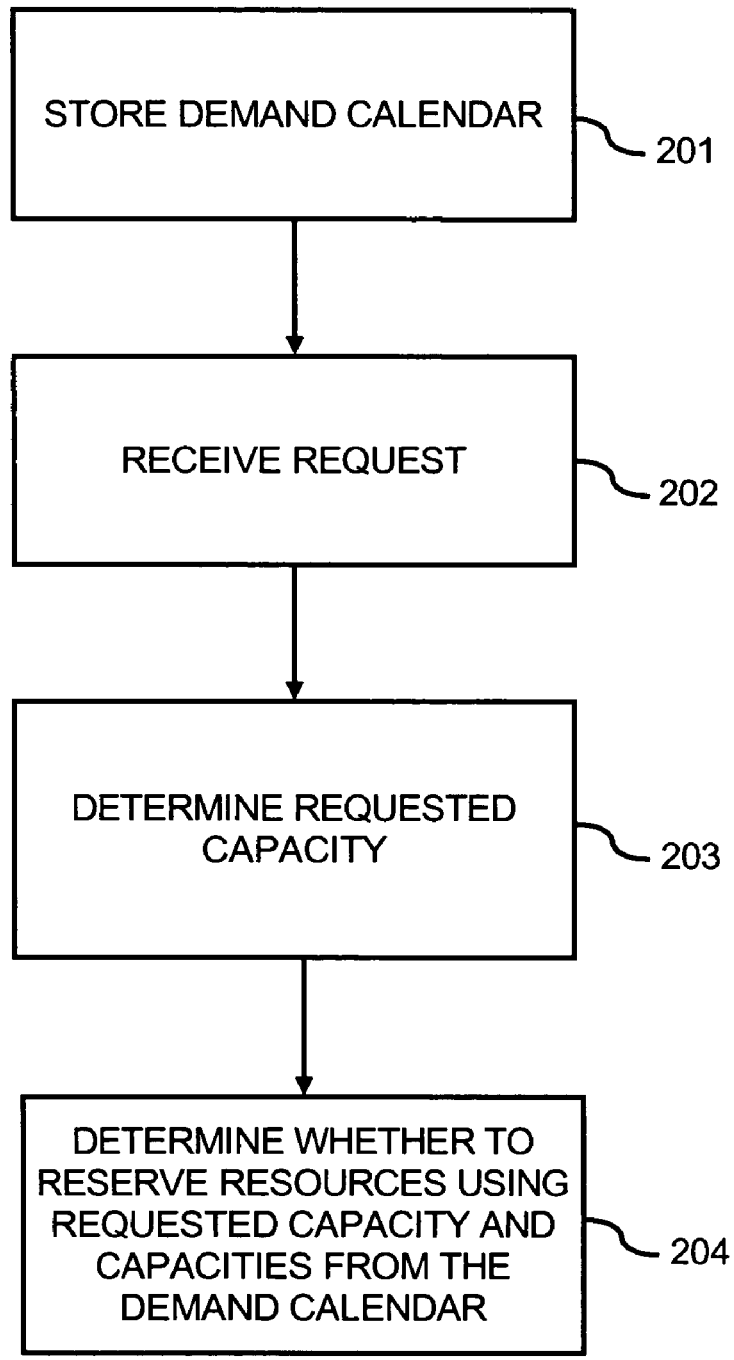
FIG. 2 illustrates a flow chart of a method for reserving resources to support user desktop utility demand, according to an embodiment.

FIG. 2 illustrates a flow chart of a method 200 for reserving resources in a resource-on-demand system to support user desktop utility demand. The method 200 is described with respect to FIG. 1 by way of example and not limitation.

At step 201, a demand calendar specifying capacities of resources in the resource-on-demand system 100 reserved to support user desktop utility demand for future time periods is stored, for example, in the database 150.

At step 202, the capacity manager 130 receives a request for resources to support user desktop utility demand for a requested future time period. For example, the requests 141-143 are received.

At step 203, the capacity manager 130 determines a requested capacity for the user desktop utility demand. For example, the requested capacity of 110 capacity units is calculated for the request 141.

At step 204, using the requested capacity and capacities from the demand calendar for the requested future period of time, the capacity manager 130 determines whether resources for the requested capacity are to be reserved. In one example, the requested capacity for the requested future period, such as a year, is determined for intervals, such as daily or weekly requested capacities. The requested capacities are compared to the available capacity for these intervals to determine whether the request is rejected or accepted.

Figure 3:
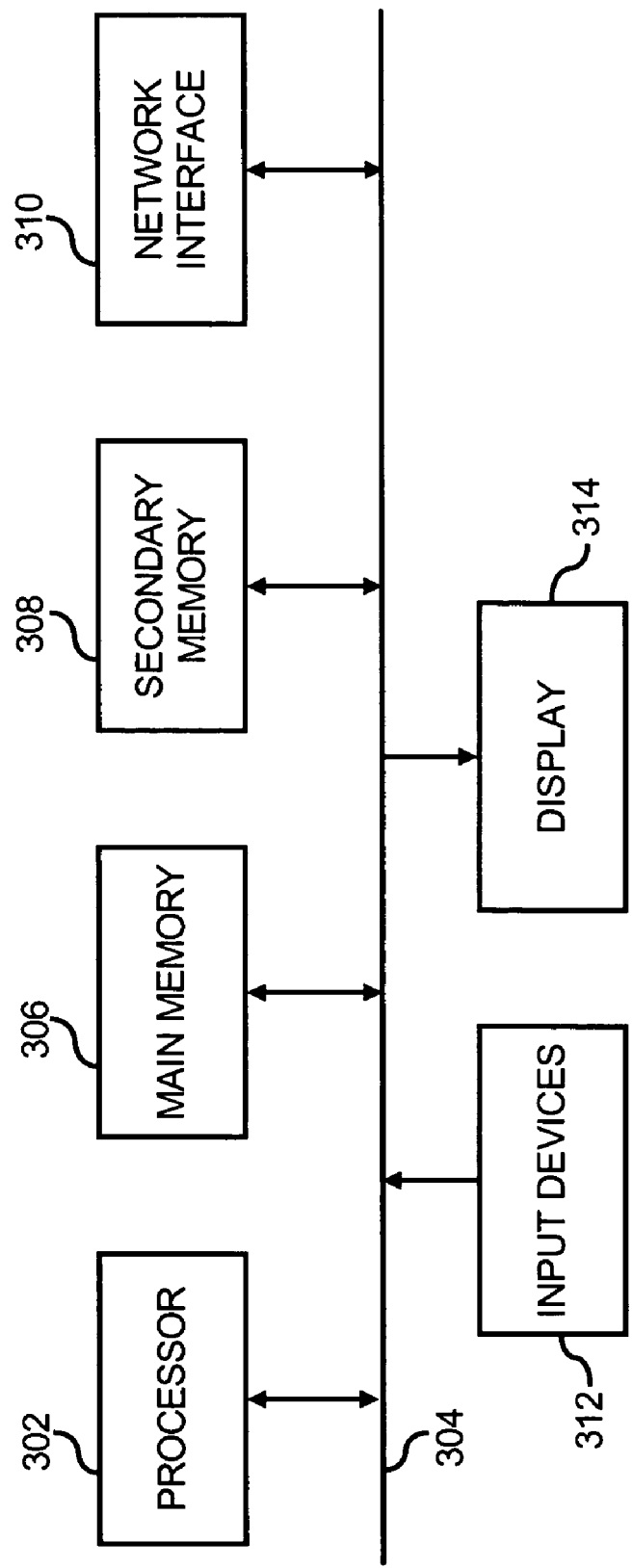
FIG. 3 illustrates a computer system, according to an embodiment.

Referring to FIG. 3, a schematic block diagram of a computer system 300 is shown in accordance with an embodiment. The computer system 300 shown may be used as a platform for the capacity manager 130 and/or the resource manager 120 shown in FIG. 1.

The computer system 300 includes one or more processors, such as processor 302, providing an execution platform for executing software. Commands and data from the processor 302 are communicated over a communication bus 304. The computer system 300 also includes a main memory 306, such as a random access memory (RAM), where software may be resident during runtime, and a secondary memory 308. The secondary memory 308 includes, for example, a hard disk drive or other type of storage device. Other examples of the secondary memory 308 include ROM (read only memory), EPROM (erasable, programmable ROM), EEPROM (electrically erasable, programmable ROM).

The computer system 300 optionally includes user interfaces comprising one or more input devices 312, such as a keyboard, a mouse, a stylus, and the like. The computer system 300 also optionally includes a display 314. A network interface 310 is provided for communicating with other computer systems. It will be apparent to one of ordinary skill in the art that the computer system 300 may include more or less features depending on the complexity of the system needed.

It will be apparent to one of ordinary skill in the art that FIG. 3 is meant to illustrate a generic computer system. Any type of computer system may be used. Furthermore, one or more components of the components of the computer system 300 are optional, such as the display and input devices, and other types of components may be used or substituted as is known in the art.

One or more of the steps of the method 200 and other steps described herein may be implemented as software embedded or stored on a computer readable medium, such as the memory 306, and executed by the processor 302. The steps may be embodied by a computer program, which may exist in a variety of forms both active and inactive. For example, there may exist as software program(s) comprised of program instructions in source code, object code, executable code or other formats for performing some of the steps when executed, for example, by the processor 302. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. It is therefore to be understood that those functions enumerated herein may be performed by any electronic device capable of executing the above-described functions.

What is claimed is:

1. A method for reserving resources in a resource-on-demand system to support user desktop utility demand, the method comprising:

storing a demand calendar specifying capacities of resources in the resource-on-demand system reserved to support user desktop utility demand for future time periods;

receiving a request for resources to support user desktop utility demand for a requested future time period;

determining a requested capacity for the user desktop utility demand; and using the requested capacity and capacities from the demand calendar for the requested future period of time to determine whether resources for the requested capacity are to be reserved by determining an available capacity for each of a plurality of intervals in the requested future period of time; and reserving the requested capacity for the requested future period of time if the available capacity for each interval is greater than the requested capacity.

2. The method of claim 1, further comprising:

sizing a virtual machine for each interval, wherein each virtual machine is allocated to the requested capacity to support user desktop utility demand for the interval.

3. The method of claim 1, further comprising:

rejecting the request if the available capacity is less than the requested capacity for any of the intervals.

4. The method of claim 1, further comprising:

determining a resource allocation objective; and selecting resources to be allocated to the requested capacity using a fitting function to meet the resource allocation objective.

5. The method of claim 4, further comprising:

calculating a fitness value to determine how well the resource allocation objective is being met.

6. The method of claim 1, further comprising:

storing a plurality of user classes and a capacity requirement for each user class;

determining the requested capacity based on a number of users in each user class specified in the request and the stored capacity requirement for each user class.

7. The method of claim 6, further comprising:

determining a priority for each of a plurality of requested capacities scheduled on the demand calendar; and rejecting a scheduled requested capacity if a priority for a newly requested capacity of higher priority is received.

8. The method of claim 7, wherein the priority of each of the requested capacities is determined based on the highest priority user class associated with each requested capacity.

9. The method of claim 1, further comprising:

calculating a single capacity unit value to represent the requested capacity; and comparing the single capacity unit value to capacity unit values for available resources for the requested future time period to determine whether to reserve the resources for the requested capacity for the requested future period of time.

10. The method of claim 9, wherein the request includes a request for resources characterized by multiple attributes and the method comprises:

identifying a quantum for each resource attribute;

calculating candidate capacity unit values for the resource attributes using the quantums; and selecting one of the candidate capacity unit values as the single capacity unit value.

11. The method of claim 10, further comprising:

identifying the quantum for each resource attribute from a policy of a plurality of policies.

12. The method of claim 1, further comprising:

converting multiple resource attributes for the request to a plurality of capacity unit values; and selecting one capacity unit value from the plurality of the capacity unit values as the requested capacity based on whether the selected capacity unit value is to represent the requested capacity or a capacity of a physical machine to support the user desktop utility demand for the request.

13. A system comprising:

a database storing a demand calendar specifying capacities of resources in the resource-on-demand system reserved to support user desktop utility demand for future time periods; and a capacity manager receiving a request for resources to support user desktop utility demand for a requested future period of time and determining a requested capacity for the user desktop utility demand, wherein the capacity manager includes a fitter using the requested capacity and capacities from the demand calendar for the requested future period of time to determine whether resources for the requested capacity are to be reserved by determining an available capacity for each of a plurality of intervals in the requested future period of time; and reserving the requested capacity for the requested future period of time if the available capacity for each interval is greater than the requested capacity.

14. The system of claim 13, wherein the capacity manager further comprises:

a capacity unit converter converting multiple resource attributes for the request to a plurality of capacity unit values and the capacity manager selects one capacity unit value from the plurality of the capacity unit values as the requested capacity based on whether the selected capacity unit value is to represent the requested capacity or a capacity of a physical machine to support the user desktop utility demand for the request.

15. The system of claim 14, wherein the fitter compares the selected capacity unit value representing the requested capacity to available capacity unit values in the demand calendar for the requested future time period to determine whether to reserve the resources.

16. The system of claim 13, wherein the database stores a plurality of user classes and a capacity requirement for each user class, and the requested capacity is determined based on the capacity requirement for each user class.

17. The system of claim 16, wherein reservations for requested capacities are prioritized based on priorities for user classes.

18. A non-transitory computer readable medium upon which is embedded programmed instructions which when executed by a processor will cause the processor to perform a method for reserving resources in a resource-on-demand system to support user desktop utility demand, the method comprising:

storing a demand calendar specifying capacities of resources in the resource-on-demand system reserved to support user desktop utility demand for future time periods;

receiving a request for resources to support user desktop utility demand for a requested future time period;

determining a requested capacity for the user desktop utility demand; and using the requested capacity and capacities from the demand calendar for the requested future period of time to determine whether resources for the requested capacity are to be reserved by determining an available capacity for each of a plurality of intervals in the requested future period of time; and reserving the requested capacity for the requested future period of time if the available capacity for each interval is greater than the requested capacity.

19. The computer readable medium of claim 18, wherein the method further comprises:

sizing a virtual machine for each interval, wherein each virtual machine is allocated to the requested capacity to support user desktop utility demand for the interval.

20. The computer readable medium of claim 18, wherein the method further comprises:

converting multiple resource attributes for the request to a plurality of capacity unit values; and selecting one capacity unit value from the plurality of the capacity unit values to represent the requested capacity based on whether the selected capacity unit value is to represent the requested capacity or a capacity of a physical machine to support the user desktop utility demand for the request.

\* \* \* \* \*